United States Patent [19]

O'Neal, III

[11] Patent Number: 5,079,954
[45] Date of Patent: Jan. 14, 1992

[54] VACUUM GAUGE

[75] Inventor: Charles D. O'Neal, III, Bolton, Mass.

[73] Assignee: The BOC Group, Inc., Murray Hill, N.J.

[21] Appl. No.: 634,377

[22] Filed: Dec. 27, 1990

[51] Int. Cl.$^5$ .............................................. G01L 21/12
[52] U.S. Cl. ........................................ 73/755; 73/708; 330/789; 338/36
[58] Field of Search ............... 73/755, 706, 708, 40, 73/49.2, 49.3; 374/143; 324/105, 71.1; 307/299.1; 330/289; 338/36

[56] References Cited

U.S. PATENT DOCUMENTS

| | | | |
|---|---|---|---|
| 2,736,200 | 2/1956 | Kleimack et al. | 73/755 |
| 3,066,537 | 12/1962 | Rivera | 73/755 |
| 3,139,754 | 7/1964 | Dore | 73/754 |
| 3,884,080 | 5/1975 | Chapman | 73/755 |
| 4,123,698 | 10/1978 | Timko et al. | 323/1 |
| 4,134,304 | 1/1979 | Yamamoto | 73/755 |
| 4,369,661 | 1/1983 | Gibb | 73/755 |
| 4,492,123 | 1/1985 | Reich | 73/755 |
| 4,541,286 | 9/1985 | Holme | 73/755 |
| 4,682,503 | 7/1987 | Higashi | 73/755 |
| 4,995,264 | 2/1991 | Stocker et al. | 73/755 |

OTHER PUBLICATIONS

"Temperature Measurement Components", vol. 1, pp. 8-15 to 8-21.
"IEEE Journal of Solid-State Circuits", Dec. 1976, pp. 784-788.

Primary Examiner—Donald O. Woodiel
Attorney, Agent, or Firm—Robert I. Pearlman; David M. Rosenblum

[57] ABSTRACT

The present invention provides a vacuum gauge having two integrated circuits connected in a half bridge circuit to register subatmospheric gas pressure from a change in thermal gas conductivity. One of the integrated circuits serves to generate an electrical current proportional to the ambient temperature and a function of its power output conducted by the gas. The other of the integrated circuits acts as a reference to generate an electrical current proportional to ambient temperature. The half bridge circuit acts to subtract the currents so that subatmospheric pressure can be read on an ammeter as a function of gas thermal conductivity.

10 Claims, 1 Drawing Sheet

VACUUM GAUGE

BACKGROUND OF THE INVENTION

The present invention relates to vacuum gauges for registering the subatmospheric pressure of a gas. More particularly, the present invention relates to a vacuum gauge in which the subatmospheric pressure of the gas is registered as a function of the reduced thermal conductivity of the gas at the subatmospheric pressure to be registered.

The prior art has provided thermal conductivity vacuum gauges such as the well known Pirani gauge. Pirani gauges employ two load resistors having positive temperature coefficients connected in the outlying legs of a half bridge circuit. The half bridge circuit also employs a power supply to apply constant voltages, at a constant current, across the two load resistors and a voltmeter to register voltage imbalances between the outlying legs of the half bridge circuit.

One of the two load resistors is supported in an insulated manner such that the heat produced from its electrical power output is by in large conducted in the gas. As the gas pressure falls below atmospheric pressure, there will be less of a statistical concentration of gas molecules to conduct the heat. As a result, the resistor will self-heat to a temperature above ambient temperature. The elevated temperature will increase the resistance of the resistor and therefore, the voltage drop produced by the resistor. The voltage drop of the resistor has two additive components, namely, ambient temperature and the temperature rise above ambient temperature as a function of the reduced thermal conductivity of the gas at subatmospheric pressures. Since the thermal conductivity of the gas is a function of its subatmospheric pressure, the latter component of the voltage drop is also a function of subatmospheric pressure. The other load resistor is connected to a heat sink at ambient temperature to produce a voltage drop related to ambient temperature. The half bridge circuit acts to subtract the voltage drops produced by the load resistors; and the resultant voltage, which is essentially a function of subatmospheric pressure, is read from the voltmeter and correlated with subatmospheric pressure.

One major problem with Pirani gauges and in general, vacuum gauges using resistors, is that their precision of measurement is completely dependent upon the resistors having identical temperature characteristics and the degree to which constant and equal voltages can be precisely applied by the power supply across the resistors. Power supplies and resistors having the requisite precision are expensive. Other problems with Pirani gauges and the like relate to the operating temperature of their resistors which can exceed 340 K. At such temperatures, the resistors begin to radiate heat to introduce an inaccuracy in the readings. Furthermore, since pump oils used in vacuum pumps begin to break down at such temperatures, contamination can be introduced into vacuum pumped environments by the use of such gauges in the monitoring of the function of vacuum pumps. A further disadvantage is that such gauges have a relatively long response time until reaching a steady state at which pressure readings may be taken. As will be discussed, the present invention overcomes these and other drawbacks of such prior art vacuum gauges.

SUMMARY OF THE INVENTION

The present invention provides a vacuum gauge for registering subatmospheric pressure of a gas from reduced thermal conductivity of the gas at the subatmospheric pressure. The vacuum gauge comprises a pair of first and second integrated circuits. Each of the integrated circuits has two terminals and temperature transducing means connected to the two terminals. The temperature transducing means generates an electrical current as a function of the temperature thereof when a potential is applied to the two terminals and also, a power output dissipated as heat energy.

First and second mounting means are provided for mounting the first and second integrated circuits in an insulated manner and to a thermal ground of ambient temperature, respectively. At subatmospheric pressures, the temperature transducing means of the first integrated circuit self-heats as a result of the reduced thermal conductivity provided by the gas for the conduction of its heat energy. As a result, a difference between the temperatures and thus, the currents of the temperature transducing means of the first and second integrated circuits is produced. This difference between the temperatures and the currents is a function of the subatmospheric pressure.

The first integrated circuit has a substrate into which the terminals and the temperature transducing means thereof are integrated and from which the heat energy is conducted by the gas. The substrate has a surface area sized such that heat energy is conducted by the gas in a range of pressure including the subatmospheric pressure to be registered.

The two integrated circuits are connected in a circuit having power supply means for applying the potential across the two terminals of each of the first and second integrated circuits. Such a circuit is preferably a half bridge circuit to provide subtraction means for producing the difference between the currents of the first and second integrated circuits. The circuit also has registering means for registering the difference in the currents and therefore, the subatmospheric pressure from the function thereof.

BRIEF DESCRIPTION OF THE DRAWINGS

While the specification concludes with claims particularly pointing out the subject matter that applicant regards as his invention, it is believed that the invention will be better understood from the following description taken in conjunction with the accompanying drawings in which:

DETAILED DESCRIPTION

Figure 2:
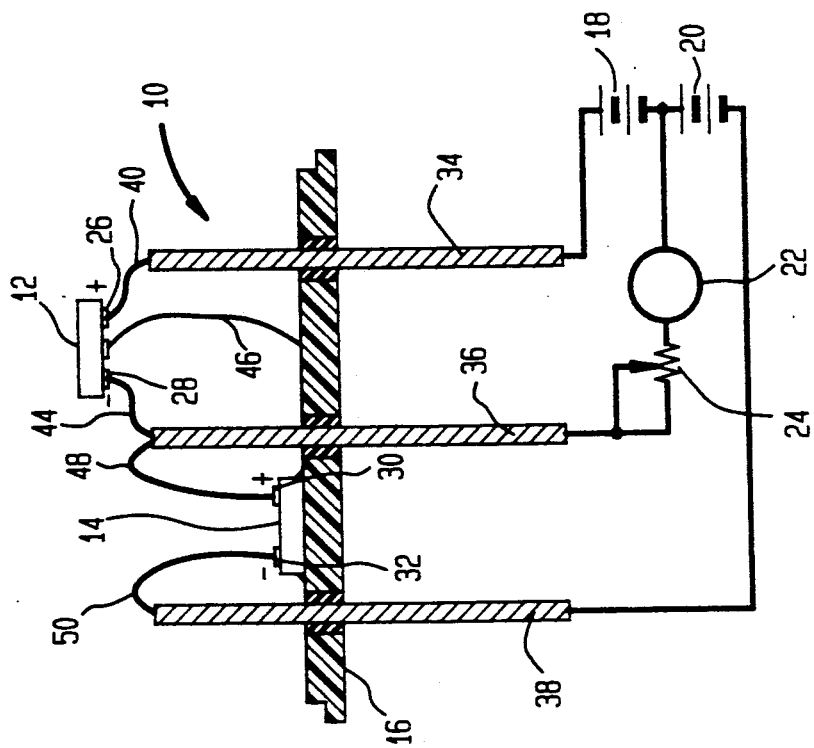
FIG. 2 is a cross-sectional view of FIG. 1 taken along line 2—2 of FIG. 1 with associated electrical circuitry shown as a schematic.
Figure 1:
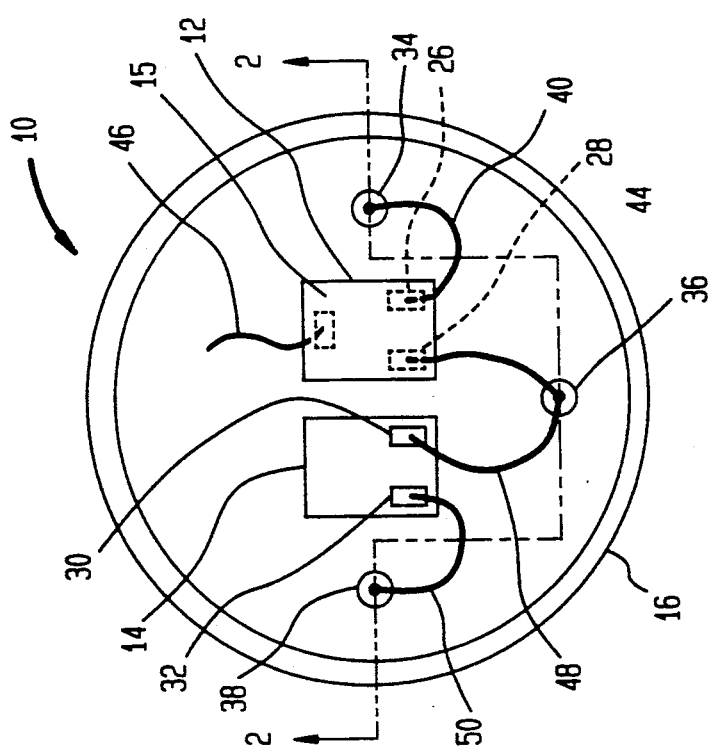
FIG. 1 is a top plan view of a vacuum gauge in accordance with the present invention.

With reference to the FIGS. 1 and 2, a vacuum gauge 10 in accordance with the present invention as illustrated. Vacuum gauge 10 comprises a pair of first and second integrated circuits 12 and 14, a TO Series Header 16, a pair of batteries 18 and 20, an ammeter 22, and an optional span potentiometer 24.

Integrated circuits 12 and 14 are provided with terminals 26 and 28; and 30 and 32, respectively. Each of the first and second integrated circuits 12 and 14 has temperature transducing circuitry connected to the terminals. Such circuitry includes two transistors having a constant ratio of emitter current densities when a potential, supplied by battery 18, is applied across terminals 26 and 28 of first integrated circuit 12; and a potential, supplied by battery 20 is applied across terminal 30 and 32 of second temperature transducer 14. The constant ratio of emitter current densities produces a differential base emitter voltage between the two transistors varying in accordance with the absolute temperature of the two transistors. The circuitry also includes a resistor having a temperature coefficient of about 0.0 and across which the differential voltage is impressed. The presence of the resistor produces a current from the differential voltage proportional to the absolute temperature of the two transistors. As will be discussed, the integrated circuit employed is a modified integrated circuit manufactured by Analog Devices of Norwood, Me. and sold as an Analog Device No. AD590. Such integrated circuit is described in U.S. Pat. No. 4,123,698, the specification and drawings of which are hereby incorporated by reference.

Header 16 is provided with a set of three thermally and electrically insulated feedthroughs 34, 36, and 38. Such assemblage serves two functions, namely, that of a heat sink having a temperature equal to the ambient temperature of the subatmospheric environment and also as a junction block to connect first and second integrated circuits 12 and 14 to batteries 18 and 20, ammeter 22, and optionally, potentiometer 24.

First integrated circuit 12 is connected at terminals 26 and 28 to electrical feedthroughs 34 and 36 by electrical conductors 40 and 44 so as to be suspended above header 16. Additionally, an offset mechanical stabilizing lead 46 is attached at one end to header 16, and at the other end, is attached to a substrate 15 of first integrated circuit 12. Preferably, conductors 40, 44 and 46 are formed from aluminum wire having a diameter of approximately 0.041 mm. and a length of about 6.2 mm. Aluminum when drawn into wires having a high length to diameter ratio such as given above is a poor thermal conductor and can thus act to mount integrated circuit 12 in an insulated manner whereby heat generated in first integrated circuit 12 is by and large only conducted by the gas. Second integrated circuit 14 is attached to header 16 so as to be in good thermal contact therewith. Therefore, second integrated circuit 14 is at a thermal ground of ambient temperature. Conductors 48 and 50 are provided to connect terminals 30 and 32 of second integrated circuit 14 to feedthroughs 36 and 38 of header 16.

Batteries 18 and 20, which with the particular preferred integrated circuits, have a voltage output in a range of approximately 3.0 to 12.0 volts, are wired in series and are connected to feedthroughs 34 and 38 of header 16. Ammeter 22 and optionally potentiometer 24 are connected in series between batteries 18 and 20 and to feed through 36 of header 16. As is evident, a half-bridge circuit is produced having two outlying less and a central leg. One of the outlying legs is formed by first integrated circuit 12, electrical conductors 40 and 44, electrical feedthrough 34, and battery 18. The other outlying leg is formed by second integrated circuit 14, electrical conductors 48 and 50, feedthrough 38 and battery 20. The central leg is formed by ammeter 22, optional potentiometer 24, and feedthrough 36. The half-bridge circuit, thus formed, acts to subtract the currents in the two outlying legs to form a difference signal in the central legs representing the difference in the currents in the outlying legs.

Both first and second integrated circuits 12 and 14 have an electrical power output approximately equal to the product of the applied potential and the current produced in each. Such electrical power output is dissipated from first and second integrated circuits 12 and 14 as heat energy. In the case of first integrated circuit 12, the heat energy is essentially only conducted by the gas to be measured because of its thermally insulated mounting. However, as the subatmospheric pressure of the gas drops, such heat energy is conducted by the gas in ever decreasing amounts with the decrease in the average number of gas molecules. As a result, first integrated circuit 12 will self-heat to increase its temperature above ambient temperature. The self-heated temperature of first integrated circuit 12 will be approximately equal to ambient temperature plus a function of the subatmospheric pressure of the gas. Since second integrate circuit 14 is in good thermal contact with a heat sink, to wit: header 16, its temperature will always be approximately equal to ambient temperature.

Terminals 26 and 28 and the temperature transducing circuitry of first integrated circuit 12 are integrated into substrate 15 thereof. Dissipated heat produced from its power output is conducted by the gas to be measured from substrate 15. Substrate 15 must have a sufficient surface area to encounter a sufficient number of gas molecules at the subatmospheric pressure to be measured. Substrate 15 of the illustrated Analog Devices AD590 integrated circuit used herein, when modified, has an area sufficient to measure the subatmospheric pressure in a range of between about $1.0 \times 10E-3$ and about 5.0 Torr. It is to be noted that this is a specifically valuable range for measurement in that roughing pumps cut out within this range.

As may be appreciated, the larger the surface area of the substrate, the lower the subatmospheric pressure that can be sensed by first integrated circuit 12. However, as substrate 15 increases in size, its volume also increases. The thermal inertia possessed by first integrated circuit 12 increases with the increase in volume as does the time delay for first integrated circuit 12 to reach a steady state. It has been found by the inventor herein, that for common substrates, such as manufactured from silicon or gallium arsenide, a surface area to volume ratio of approximately no less than 600.0 is preferred. The Analog AD590 Devices Integrated circuit has a surface area to volume ratio of approximately 200.0 which is unsuitable for vacuum gauge 10. As such, substrate 15 is backlapped to about 0.254 mm. in thickness to bring the surface area to volume ratio to about 600.0. It is to be further noted that first and second integrated circuits 12 and 14 are passivated with silicon dioxide in order to improve their chemical resistance.

As mentioned previously, the half-bridge circuit described above acts to subtract the currents produced by the first and second temperature transducers 12 and 14 to produce a difference in the currents which is registered in the central leg by ammeter 22. The Analog Devices AD590 integrated circuit has a constant span of about $1.0 \times 10E-6$ amperes per degree Kelvin and an output of about $298.0 \times 10E-6$ amperes at about 298.0 degrees Kelvin. The difference in the currents will therefore be proportional to the temperature difference between the temperature transducing means of first and second temperature transducers 12 and 14. Since the current of first integrated circuit 12 is proportional to a sum of ambient temperature and a function of the subatmospheric pressure of the gas and the current of second integrated circuit 14 is proportional to ambient temperature, the difference between the currents will be a function of the subatmospheric pressure of the gas. In accordance with the response characteristics of the Analog Devices AD590 integrated circuit, ammeter 22 may be an ammeter having a scale reading from about 0.0 to about 100.0 microamperes.

Since ammeter 22 only registers current as a function of subatmospheric pressure, the scale reading of ammeter 22 must be correlated with subatmospheric pressure by calibrating vacuum gauge 10 in a well known manner. Since the thermal conductivity of gases differ, a span potentiometer 24 may optionally be included. During calibration, span potentiometer 24 would be set to provide readings at the low and high end of the pressure range to be measured by vacuum gauge 10.

As mentioned above, the advantages of the present invention over a prior art Pirani gauge are manifest. As has been discussed, first and second integrated circuits 12 and 14 can be formed from a commercially available integrated circuit, namely the Analog Devices AD590. This integrated circuit has a threshold voltage of just less than 3.0 volts which does not have to be constant for its proper functioning. As such, the power source, as illustrated and described above, can be inexpensive batteries. Moreover, since the magnitude of the current output of each integrated circuit is measured in microamperes, the power output thereof is low enough for radiation heat transfer to be practically nonexistent, as well as the possibility that excessive temperatures will be created that can cause the breakdown of lubricating oils. Lastly, when the substrate of such an integrated circuit is modified in accordance with the present invention to have the optimum surface area to volume ratio of no less than 600.0, the response time can be measured in fractions of seconds.

Although preferred embodiments have been shown and described in detail, it will be readily understood and appreciated by those skilled in the art that numerous omissions, changes, and additions may be made without departing from the spirit and scope of the invention.

I claim:

1. A vacuum gauge for registering subatmospheric pressure of a gas from reduced thermal conductivity of the gas at the subatmospheric pressure, said vacuum gauge comprising:
   a pair of first and second integrated circuits each having two terminals, temperature transducing means connected to the two terminals for generating a current proportional to the temperature thereof when a potential is applied across the two terminals and an electrical power output dissipated as heat energy;
   first and second mounting means for mounting the first and second integrated circuits in an insulated manner and to a thermal ground of ambient temperature, respectively, such that at the subatmospheric pressure, the temperature transducing means of the first integrated circuit self-heats as a result of the reduced thermal conductivity provided by the gas for the conduction of its heat energy, the self-heating in the first integrated circuit producing a difference between the temperatures and thus, the currents generated in the first and second integrated circuits as a function of the subatmospheric pressure;
   the first integrated circuit having a substrate into which the two terminals and the temperature transducing means are integrated and from which the heat energy is conducted by the gas, the substrate having a surface area sized such that the heat energy is conducted by the gas in a pressure range including the subatmospheric pressure to be registered; and
   a circuit connected to the two terminals of each of the first and second integrated circuits and having, power supply means for applying the potential across the two terminals of each of the first and second integrated circuits, subtraction means for producing the difference in the currents, and registration means for registering the difference between the currents and therefore, the subatmospheric pressure from the function thereof.

2. The vacuum gauge of claim 1, wherein the substrate of the first integrated circuit has a volume sized such that a ratio of the surface area thereof to the volume is not less than 600.0.

3. The vacuum gauge of claim 1 wherein each of the first and second integrated circuits are passivated with silicon dioxide to provide chemical resistance.

4. The vacuum gauge of claim 1, wherein the temperature transducing means includes two transistors having a constant ratio of emitter current densities when the potential is applied across the two terminals to produce a differential base emitter voltage between the two transistors, the differential base emitter voltage proportional to the temperature as measured at the two transistors, and a resistor having a temperature coefficient of about 0.0 and across which the differential voltage is impressed for producing the current proportional to absolute temperature.

5. The vacuum gauge of claim 4, wherein the substrate of the first integrated circuit has a volume sized such that a ratio between the surface area thereof to the volume is no less than 600.0.

6. The vacuum gauge of claim 5, wherein each of the first and second integrated circuits has an output of about $298.0 \times 10E-6$ Amperes at about 298.0 degrees Kelvin and a span of about $1.0 \times 10E-6$ Amperes per degree Kelvin.

7. The vacuum gauge of claim 6 wherein the first and second integrated circuits are passivated with silicon dioxide to provide chemical resistance.

8. The vacuum gauge of claims 1 or 7 wherein:
   the power supply means comprises a pair of batteries connected in series to the two terminals of the first and second integrated circuits; and
   the circuit comprises a half bridge circuit to form the subtraction means, the half bridge circuit having two outlying legs and a central leg in which the first and second temperature transducers and the batteries comprise the outlying legs thereof, and the registering means comprises an ammeter connected in series in the central leg thereof.

9. The vacuum gauge of claim 8, wherein:
   the second mounting means comprises a TO series header at ambient temperature having a set of first, second, and third electrically and thermally insulated electrical feedthroughs;
   the first mounting means comprises a set of three thermally insulative wires, two of said wires connecting the first and second feedthroughs to the two terminals of the first integrated circuit and the third of said wires connecting the first integrated circuit to the TO series header so that the first integrated circuit is supported between the first and second feedthroughs and above the header;

the two terminals of the second integrated circuit are connected to the second and third electrical feedthroughs by a pair of electrical conductors;

the second integrated circuit is attached to the TO series header;

the batteries are connected in series between the first and third feedthroughs; and the registration means is connected between the batteries and to the second electrical feedthrough.

10. The vacuum gauge of claim 8, further comprising a span potentiometer connected in series with the ammeter in the central leg to calibrate the vacuum gauge on account of the specific thermal conductivity of the gas.

* * * * *